(12) United States Patent
Kojima et al.

(10) Patent No.: US 10,783,663 B2
(45) Date of Patent: Sep. 22, 2020

(54) GAZE-TRACKING DEVICE, COMPUTABLE READABLE MEDIUM, AND METHOD

(71) Applicant: AISIN SEIKI KABUSHIKI KAISHA, Kariya-shi, Aichi-ken (JP)

(72) Inventors: Shinichi Kojima, Nagakute (JP); Shin Osuga, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 84 days.

(21) Appl. No.: 16/002,455

(22) Filed: Jun. 7, 2018

(65) Prior Publication Data

US 2018/0357790 A1 Dec. 13, 2018

(30) Foreign Application Priority Data

Jun. 9, 2017 (JP) ................. 2017-114763

(51) Int. Cl.
*G06T 7/73* (2017.01)
*G06K 9/00* (2006.01)
*G06T 3/00* (2006.01)

(52) U.S. Cl.
CPC ............. *G06T 7/75* (2017.01); *G06K 9/0061* (2013.01); *G06T 3/0068* (2013.01); *G06K 9/00268* (2013.01); *G06T 2207/30201* (2013.01)

(58) Field of Classification Search
None
See application file for complete search history.

(56) References Cited

U.S. PATENT DOCUMENTS

2003/0123027 A1 7/2003 Amir et al.
2019/0156100 A1* 5/2019 Rougeaux .......... G06K 9/00597

FOREIGN PATENT DOCUMENTS

JP 2007-004448 A 1/2007
JP 2010-151951 A 7/2010
(Continued)

OTHER PUBLICATIONS

Li Sun et al., "Real-Time Gaze Estimation with Online Calibration", IEEE Multimedia, New York, NY, US, Oct. 1, 2014, pp. 28-37, XP011563649, ISSN: 1070-986X, 10 pages.
(Continued)

*Primary Examiner* — Fan Zhang
(74) *Attorney, Agent, or Firm* — Sughrue Mion, PLLC

(57) ABSTRACT

A corneal-reflection-based gaze detection section calculates a time series of a three-dimensional gaze vector in a camera coordinate system from a time series of facial images. A face position-and-orientation estimation section estimates a time series of a three-dimensional position and orientation of a face. An eyeball-center-coordinates transformation section calculates a time series of a three-dimensional position of the eyeball center in a coordinate system of a three-dimensional facial model. A fixed parameter calculation section calculates for use as a fixed parameter a three-dimensional position of the eyeball center in the three-dimensional facial-model coordinate system. An eyeball-center-based gaze detection section uses the three-dimensional position of the eyeball center calculated by the fixed parameter calculation section to calculate a three-dimensional gaze vector from a three-dimensional position of the eyeball center to a three-dimensional position of a pupil center in the camera coordinate system. This enables accurate gaze tracking to be performed using a simple configuration and without performing calibration.

7 Claims, 10 Drawing Sheets

(56) References Cited

FOREIGN PATENT DOCUMENTS

JP            5163982 B2      3/2013
JP     02013252301 A  * 12/2013

OTHER PUBLICATIONS

Takehiko Ohno et al., "Simple-to-Calibrate Gaze Tracking Method", Passive Eye Monitoring; Algorithms, Applications and Experiments, Jan. 1, 2008, XP055427543, ISBN:978-3-540-75412-1, pp. 111-131, 21 pages.
Extended European Search Report dated Oct. 26, 2018 issued by the European Patent Office in counterpart application No. 18176601.5.
Takehiko Ohno "One-Point Personal Calibration and Its Applications", IPSJ SIG Technical Report, Jan. 13, 2006, pp. 67-74, 2006-HI-117 (10).

* cited by examiner

METHOD 1: PUPIL CENTER + EYEBALL CENTER

METHOD 2: PUPIL CENTER + CORNEAL REFLECTION

GAZE-TRACKING DEVICE, COMPUTABLE READABLE MEDIUM, AND METHOD

CROSS-REFERENCE TO RELATED APPLICATION

This application is based on and claims priority under 35 USC 119 from Japanese Patent Application No. 2017-114763 filed Jun. 9, 2017.

BACKGROUND

Technical Field

The present invention relates to a gaze-tracking device, program, and method, and particularly relates to a gaze-tracking device, computer readable medium, and method for measuring a gaze vector in an image captured of a face.

Related Art

A hitherto known gaze-tracking device: acquires an eyeball-image, this being an image of a subject looking at a predetermined screen imaging eyeballs while light from a predetermined light source is reflected by the eyeballs; from the eyeball-image, computes an optical axis that is an axis linking a curvature center of a cornea and a pupil center of a pupil; at a given time sets initial values of misalignment candidates between an optical axis and a gaze axis for each of one eyeball and another eyeball; at another time uses the optical axes computed at the other time and the misalignment candidates set at the given time for the one eyeball and the other eyeball to compute new misalignment candidates; determines an optimum misalignment from the computed misalignment candidate between the optical axis and the gaze axis for each of the one eyeball and the other eyeball; and, based on misalignment between the optical axis and the gaze axis, computes a point on the screen being stared at by the subject (Japanese Patent No. 5163982).

Moreover, a gaze-tracking method in which one point is stared at for personal specific calibration is known ("One-Point Personal Calibration and Its Applications" by Takehiko Ohno, published in IPSJ SIG Technical Report, 2006-HI-117 (10), January 2006).

SUMMARY

The device in the technology described in Japanese Patent No. 5163982 is large as it requires two cameras and two light sources.

The technology described in "One-Point Personal Calibration and Its Applications" needs a user to look at a point with known coordinates for calibration.

The present invention address the above issues, and an object thereof is to provide a gaze-tracking device, program, and method enabling accurate gaze tracking to be performed using a simple configuration and without performing calibration.

In order to achieve the above object, a gaze-tracking device according to a first aspect includes a first gaze-vector calculation section, a face position-and-orientation estimation section, an eyeball-center-position calculation section, a fixed parameter calculation section, and a second gaze-vector calculation section. From a time series of a facial image captured by an imaging section that images a face of an observation subject, and representing the face, which was imaged while light was illuminated from an illumination section onto an eye of the observation subject, the first gaze-vector calculation section uses a corneal reflection of the eye of the face in the facial image, a pupil center position of the eye of the face in the facial images, and a predetermined three-dimensional eyeball model to calculate a time series of a three-dimensional gaze vector in a camera coordinate system. The face position-and-orientation estimation section estimates a time series of a three-dimensional position and orientation of the face based on the time series of the facial image and on a predetermined three-dimensional facial model. The eyeball-center-position calculation section calculates a time series of a three-dimensional position of an eyeball center in a coordinate system of the three-dimensional facial model based on the time series of the three-dimensional position and orientation of the face estimated by the face position-and-orientation estimation section and on the time series of the gaze vector calculated by the first gaze-vector calculation section. The fixed parameter calculation section calculates for use as a fixed parameter a three-dimensional position of the eyeball center in the three-dimensional facial-model coordinate system based on the time series of the three-dimensional position of the eyeball center in the three-dimensional facial-model coordinate system calculated by the eyeball-center-position calculation section. The second gaze-vector calculation section calculates a three-dimensional gaze vector from a three-dimensional position of the eyeball center to a three-dimensional position of a pupil center in the camera coordinate system based on the pupil center position of the eye of the face in the facial image representing the face imaged by the imaging section, on the three-dimensional position of the eyeball center calculated by the fixed parameter calculation section, and on the three-dimensional position and orientation of the face estimated by the face position-and-orientation estimation section.

A computer readable medium storing a program according to a second aspect is a program that causes a computer to function as a first gaze-vector calculation section, a face position-and-orientation estimation section, an eyeball-center-position calculation section, a fixed parameter calculation section, and a second gaze-vector calculation section. From a time series of a facial image captured by an imaging section that images a face of an observation subject, and representing the face, which was imaged while light was illuminated from an illumination section onto an eye of the observation subject, the first gaze-vector calculation section uses a corneal reflection of the eye of the face in the facial image, a pupil center position of the eye of the face in the facial images, and a predetermined three-dimensional eyeball model, to calculate a time series of a three-dimensional gaze vector in a camera coordinate system. The face position-and-orientation estimation section that estimates a time series of a three-dimensional position and orientation of the face based on the time series of the facial image and on a predetermined three-dimensional facial model. The eyeball-center-position calculation section calculates a time series of a three-dimensional position of an eyeball center in a coordinate system of the three-dimensional facial model, based on the time series of the three-dimensional position and orientation of the face estimated by the face position-and-orientation estimation section and on the time series of the gaze vector calculated by the first gaze-vector calculation section. The fixed parameter calculation section calculates, for use as a fixed parameter, a three-dimensional position of the eyeball center in the three-dimensional facial-model coordinate system, based on the time series of the three-dimensional position of the eyeball center in the three-dimensional facial-model coordinate system calculated by the eyeball-center-position calculation section. Based on the pupil center position of the eye of the face in the facial image representing the face imaged by the imaging section, on the three-dimensional position of the eyeball center calculated by the fixed parameter calculation section, and on the three-dimensional position and orientation of the face estimated by the face position-and-orientation estimation section, the second gaze-vector calculation section calculates a three-dimensional gaze vector from a three-dimensional position of the eyeball center to a three-dimensional position of a pupil center in the camera coordinate system.

A gaze-tracking method according to a third aspect includes employing a first gaze-vector calculation section, a face position-and-orientation estimation section, an eyeball-center-position calculation section, a fixed parameter calculation section, and a second gaze-vector calculation section. From a time series of a facial image captured by an imaging section that images a face of an observation subject and representing the face, which was imaged while light was illuminated from an illumination section onto an eye of the observation subject, the first gaze-vector calculation section is employed to use a corneal reflection of the eye of the face in the facial image, a pupil center position of the eye of the face in the facial images, and a predetermined three-dimensional eyeball model, to calculate a time series of a three-dimensional gaze vector in a camera coordinate system. The face position-and-orientation estimation section is employed to estimate a time series of a three-dimensional position and orientation of the face, based on the time series of the facial image and on a predetermined three-dimensional facial model. The eyeball-center-position calculation section is employed to calculate a time series of a three-dimensional position of an eyeball center in a coordinate system of the three-dimensional facial model, based on the time series of the three-dimensional position and orientation of the face estimated by the face position-and-orientation estimation section and on the time series of the gaze vector calculated by the first gaze-vector calculation section. The fixed parameter calculation section is employed to calculate for use as a fixed parameter a three-dimensional position of the eyeball center in the three-dimensional facial-model coordinate system based on the time series of the three-dimensional position of the eyeball center in the three-dimensional facial-model coordinate system calculated by the eyeball-center-position calculation section. Based on the pupil center position of the eye of the face in the facial image representing the face imaged by the imaging section, on the three-dimensional position of the eyeball center calculated by the fixed parameter calculation section, and on the three-dimensional position and orientation of the face estimated by the face position-and-orientation estimation section, the second gaze-vector calculation section is employed to calculate a three-dimensional gaze vector from a three-dimensional position of the eyeball center to a three-dimensional position of a pupil center in the camera coordinate system.

BRIEF DESCRIPTION OF THE DRAWINGS

Exemplary embodiments will be described in detail with reference to the following figures, wherein.

DETAILED DESCRIPTION

Detailed explanation follows regarding exemplary embodiments of the present disclosure, with reference to the drawings. Note that the exemplary embodiments explain an example in which the technology of the present disclosure has been applied to a gaze-tracking device that estimates a gaze vector from a captured facial image.

Overview of Exemplary Embodiments of the Present Disclosure

Exemplary embodiments of the present disclosure realize gaze detection with a monocular-camera driver monitor. Representative related technology relating to gaze detection utilizing a three-dimensional eyeball model includes the following.

Figure 10A:
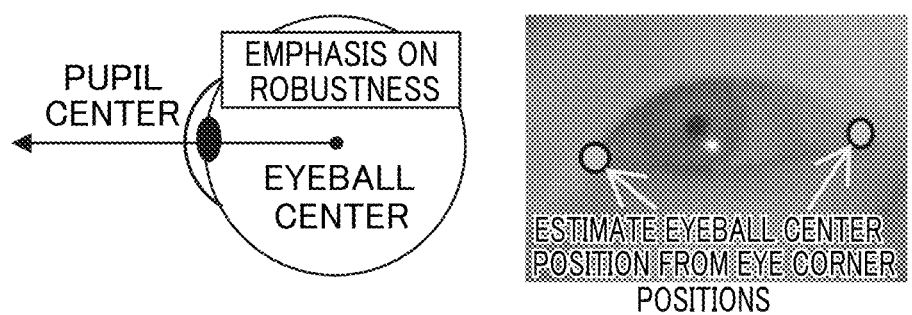
FIG. 10A is a diagram to explain a gaze-tracking method utilizing a pupil center and an eyeball center.

(Method 1) Calculating gaze using an eyeball center estimated from an outer eye corner and an inner eye corner, and a pupil center (FIG. 10A).

Figure 10B:
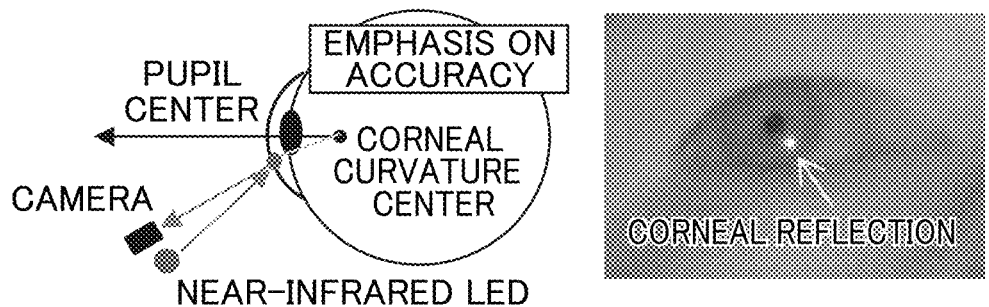
FIG. 10B is a diagram to explain a gaze-tracking method utilizing a pupil center and a corneal reflection.

(Method 2) Calculating gaze using a corneal curvature center calculated from a corneal reflection, and a pupil center (FIG. 10B).

(Method 3) Calculating gaze by switching between Method 1 and Method 2.

Method 1 is robust, but has poor gaze tracking accuracy due to issues with its eyeball-center estimation technique.

Method 2 has good gaze tracking accuracy, but is limited to situations in which a corneal reflection can be obtained, and so is only able to take measurements in a restricted range of situations, and is not very robust.

Method 3 improves gaze tracking accuracy in situations where Method 2 is used, but offers no change in gaze tracking accuracy from situations where Method 1 is used.

Exemplary embodiments of the present disclosure improve gaze tracking accuracy by using gaze calculated with Method 2 to find for use as a fixed parameter an eyeball center parameter in a facial-model coordinate system, and then to use the eyeball center parameter in the facial-model coordinate system in Method 1. This improves the accuracy of an eyeball center position, thereby improving gaze tracking accuracy in situations where Method 1 is used in Method 3. A technique has been proposed to eliminate the need to perform calibration in Method 2, but this requires plural cameras and plural light sources. In contrast thereto, exemplary embodiments of the present disclosure are able to eliminate the need to perform calibration using only a single camera and a single light source.

First Exemplary Embodiment

Gaze-Tracking Device Configuration

Figure 1:
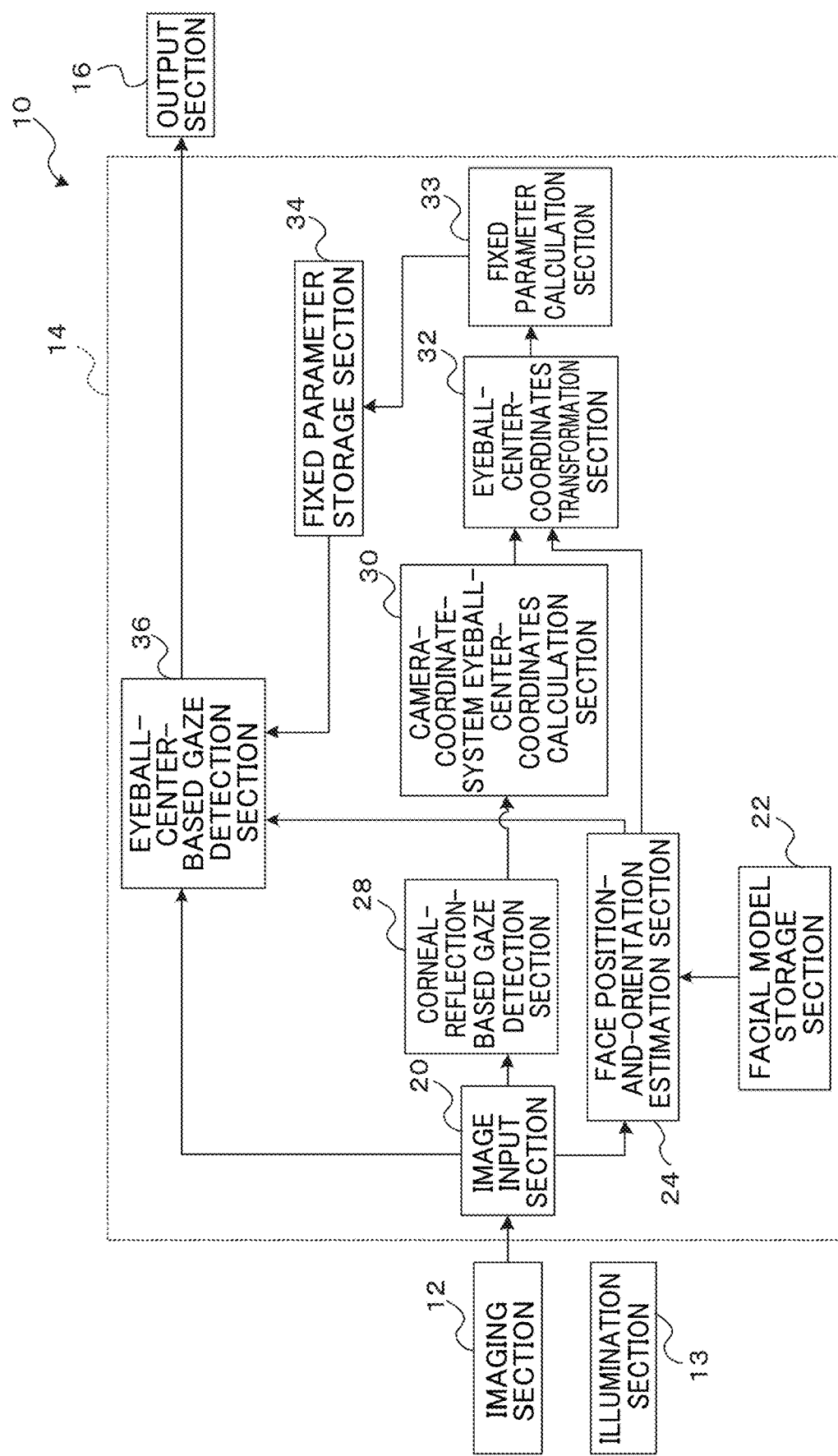
FIG. 1 is a block diagram illustrating configuration of a gaze-tracking device according to a first exemplary embodiment.

As illustrated in FIG. 1, a gaze-tracking device 10 according to a first exemplary embodiment includes an imaging section 12 configured by a CCD camera or the like for capturing an image containing the face of a target subject, an illumination section 13 that illuminates light onto the eyes of the subject, a computer 14 for performing image processing, and an output section 16 configured by a CRT or the like.

The imaging section 12 is configured by a single camera, and the illumination section 13 is, for example, configured by a single near-infrared LED. In the present exemplary embodiment, explanation is given for an example in which the imaging direction of the imaging section 12 and the illumination direction of the illumination section 13 are disposed so as to be coaxial. Note that, for example, a method employing a half mirror may conceivably be employed as a placement method to make the imaging direction of the imaging section 12 and the illumination direction of the illumination section 13 coaxial.

The computer 14 is configured including a CPU; ROM storing programs for an eyeball-center calculation processing routine and a gaze-tracking processing routine, described below; RAM for storing data and the like; and a bus that connects the CPU, ROM, and RAM. In terms of functional blocks that divide the computer 14 into functional execution units defined based on both hardware and software, as illustrated in FIG. 1, the computer 14 includes an image input section 20, a facial model storage section 22, a face position-and-orientation estimation section 24, a corneal-reflection-based gaze detection section 28, a camera-coordinate-system eyeball-center-coordinates calculation section 30, an eyeball-center-coordinates transformation section 32, a fixed parameter calculation section 33, a fixed parameter storage section 34, and an eyeball-center-based gaze detection section 36.

The image input section 20 inputs facial images that are greyscale images output from the imaging section 12. The facial model storage section 22 is stored with a three-dimensional facial model. The face position-and-orientation estimation section 24 estimates the three-dimensional position and orientation of a face based on facial images output from the image input section 20. The corneal-reflection-based gaze detection section 28 calculates a time series of a gaze vector in a camera coordinate system using a corneal reflection technique (see FIG. 10B) based on a time series of facial images output from the image input section 20. The camera-coordinate-system eyeball-center-coordinates calculation section 30 calculates a time series of coordinates of the eyeball center in the camera coordinate system based on the time series of the gaze vector calculated by the corneal-reflection-based gaze detection section 28. The eyeball-center-coordinates transformation section 32 transforms the time series of eyeball-center coordinates in the camera coordinate system to a time series of eyeball-center coordinates in a facial-model coordinate system based on a time series of three-dimensional position and orientation of a face. Based on the time series of eyeball-center coordinates in the facial-model coordinate system, the fixed parameter calculation section 33 calculates, a set of eyeball-center coordinates in the facial-model coordinate system for use as a fixed parameter. The fixed parameter storage section 34 stores the set of eyeball-center coordinates in the facial-model coordinate system that were obtained by the fixed parameter calculation section 33. The eyeball-center-based gaze detection section 36 uses a pupil center and an eyeball center to calculate a gaze vector in the camera coordinate system based on both facial images output from the image input section 20 and the set of eyeball-center coordinates in the facial-model coordinate system stored in the fixed parameter storage section 34. Note that the corneal-reflection-based gaze detection section 28 is an example of a first gaze-vector calculation section, and the eyeball-center-based gaze detection section 36 is an example of a second gaze-vector calculation section. The camera-coordinate-system eyeball-center-coordinates calculation section 30 and the eyeball-center-coordinates transformation section 32 jointly serve as an example of an eyeball-center-position calculation section.

The image input section 20 is, for example, configured including an A/D converter, image memory that stores one screen of image data, and the like.

The facial model storage section 22 stores information relating to a predetermined three-dimensional facial model (for example, three-dimensional coordinates of each feature point of a face).

The face position-and-orientation estimation section 24 extracts feature points from facial images that correspond to facial feature points in the three-dimensional facial model.

Image patterns are, for example, used to find the positions of feature points in a facial image corresponding to all the predetermined facial feature points.

As described below, based on feature points corresponding to the extracted facial feature points, the face position-and-orientation estimation section 24 estimates rotation of the face ($\psi c$, $\theta c$, $\varphi c$) and the position of the origin of the facial model (Xc, Yc, Zc) in the camera coordinate system (see FIG. 2), as the three-dimensional position and orientation of the face.

The relationship between (Xmi, Ymi, Zmi) in the facial-model coordinate system (see FIG. 2) and the same point (Xci, Yci, Zci) in the camera coordinate system is expressed by Equation (1).

$$\begin{pmatrix} Xc_i \\ Yc_i \\ Zc_i \\ 1 \end{pmatrix} = \begin{bmatrix} \cos\theta c\cos\varphi c & \sin\psi c\sin\theta c\cos\varphi c - \cos\psi c\sin\varphi c & \cos\psi c\sin\theta c\cos\varphi c + \sin\psi c\sin\varphi c & Xc \\ \cos\theta c\sin\varphi c & \sin\psi c\sin\theta c\sin\varphi c + \cos\psi c\cos\varphi c & \cos\psi c\sin\theta c\sin\varphi c - \sin\psi c\cos\varphi c & Yc \\ -\sin\theta c & \sin\psi c\cos\theta c & \cos\psi c\cos\theta c & Zc \\ 0 & 0 & 0 & 1 \end{bmatrix} \begin{pmatrix} Xm_i \\ Ym_i \\ Zm_i \\ 1 \end{pmatrix} \quad (1)$$

Equation (2) below is obtained from a formula for a perspective projection of an image, wherein f is the focal distance expressed in pixels.

$$(xi, yi) = (f\, Xci/Zci, f\, Yci/Zci) \quad (2)$$

Figure 2:
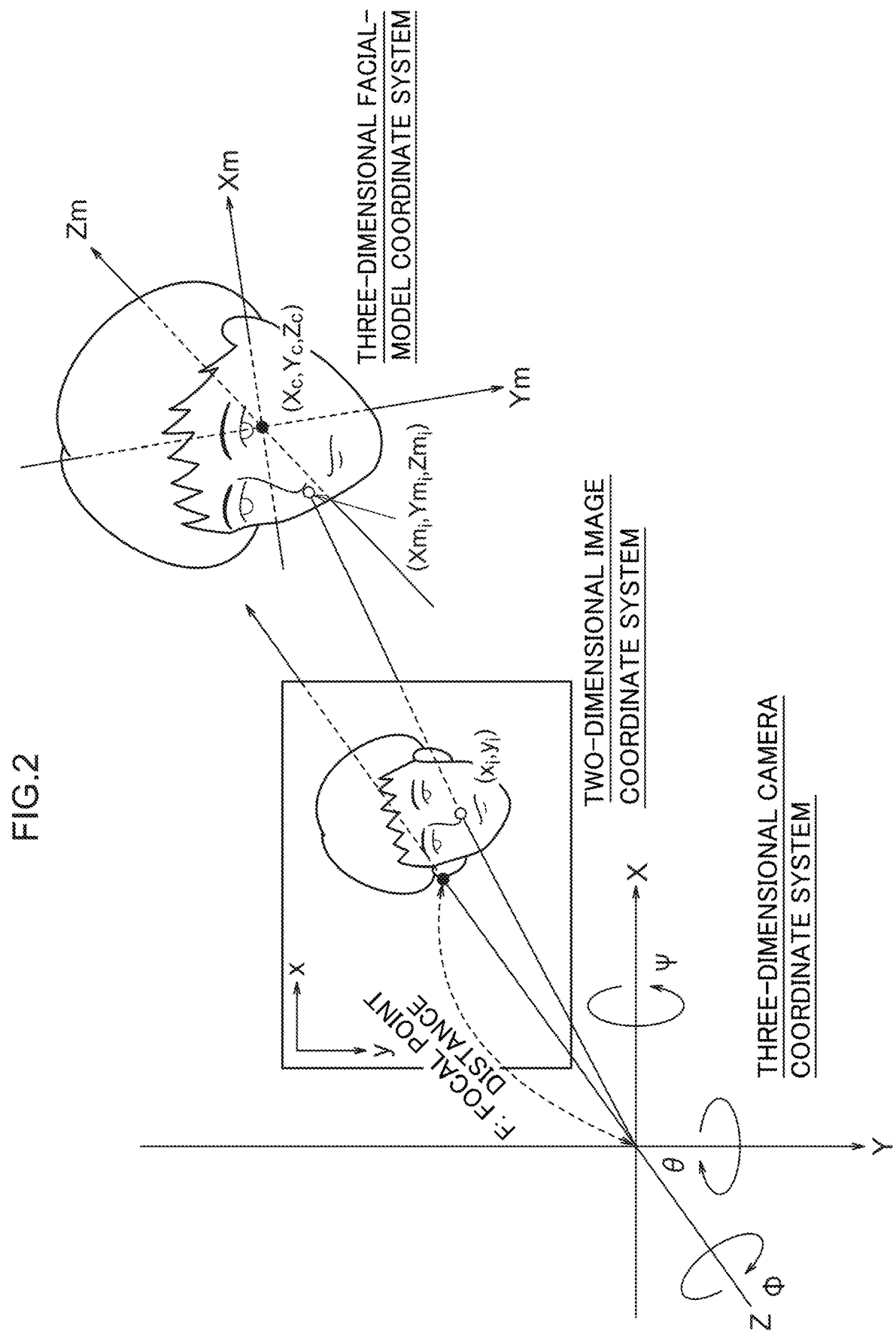
FIG. 2 is a diagram illustrating relationships between coordinate systems.

Herein, (ψc, θc, φc) and (Xc, Yc, Zc) are the variables for the position and orientation to be found, and (Xmi, Ymi, Zmi) are fixed values in the facial-model coordinate system (see FIG. 2). Thus, using appropriate initial values for the first (ψc, θc, φc) and (Xc, Yc, Zc), and using the estimated values from the previous frame thereafter, enables (xi, yi) to be numerically calculated using (ψc, θc, φc) and (Xc, Yc, Zc).

It is thus possible to calculate a squared error $e = \Sigma_{I=0 \text{ to } N-1}((x_i - xo_1)^2 + ((y_i - yo_i)^2)$, and by formulating a nonlinear optimization problem to minimize e, the (ψc, θc, φc) and (Xc, Yc, Zc) in the current frame are found, so as to give an estimation result for rotation of the face (ψc, θc, φc) in the camera coordinate system and the origin position (Xc, Yc, Zc) in the facial model.

Note that specific methods for such nonlinear optimization include the extended Kalman filter, the method of steepest descent, Newton's method, the Gauss-Newton algorithm, the Levenberg-Marquardt algorithm, and the like.

The origin position of the three-dimensional facial model can be set arbitrarily for such calculations. However, as a matter of sensible design, it is preferable to use a location near the center of rotation when a person moves their head left-to-right or up-and-down as the origin position.

In such case, when collecting data for a facial model, a vertical distance (y) and depth distance (z) from the eyes to the center of rotation of head movement should be measured for a number of people, and an average value thereof set. The horizontal direction (x) should be set so as to achieve left-right symmetry in the three-dimensional facial model.

The face position-and-orientation estimation section 24 uses the estimated rotation of the face (ψc, θc, φc) in the camera coordinate system as a rotational component R for transforming the camera coordinate system to the facial-model coordinate system, and uses the facial model origin position (Xc, Yc, Zc) as a translational component t for transforming the camera coordinate system to the facial-model coordinate system.

Figure 3:
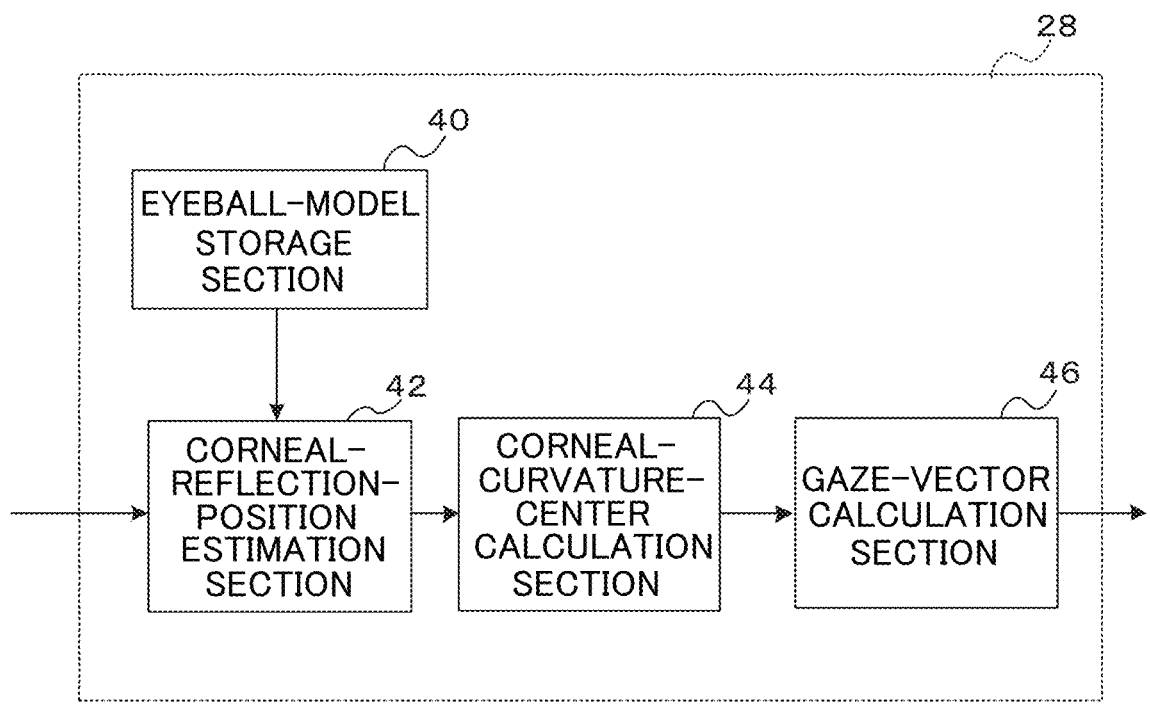
FIG. 3 is a block diagram illustrating configuration of a corneal-reflection-based gaze detection section of a gaze-tracking device according to the first exemplary embodiment.

As illustrated in FIG. 3, the corneal-reflection-based gaze detection section 28 includes an eyeball-model storage section 40, a corneal-reflection-position estimation section 42, a corneal-curvature-center calculation section 44, and a gaze-vector calculation section 46.

Figure 4:
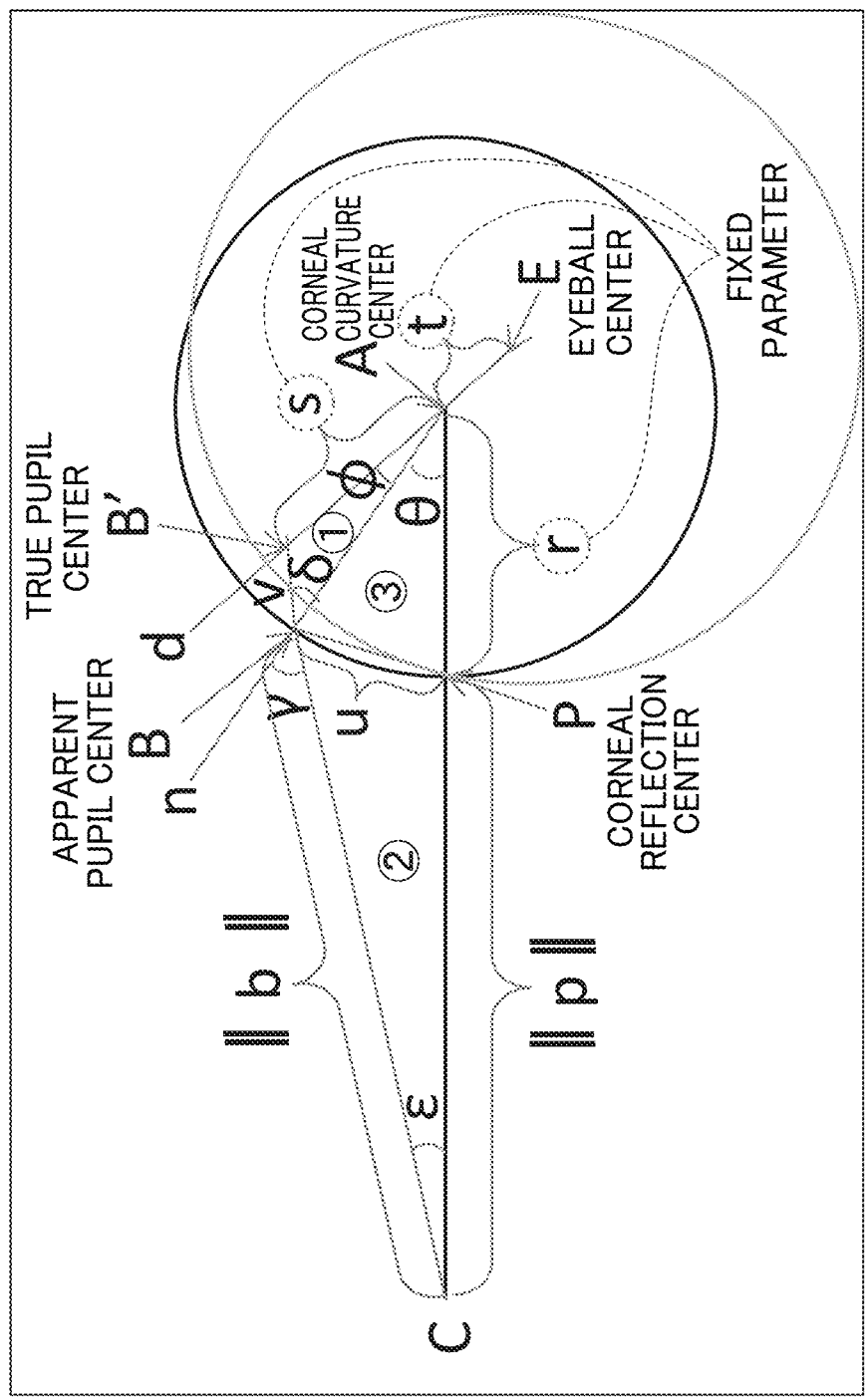
FIG. 4 is a diagram to explain a gaze detection method utilizing a corneal reflection technique.

The eyeball-model storage section 40 is stored with: a set of provisional eyeball-center coordinates E in the facial-model coordinate system; positional relationships between, and the sizes of, a sphere corresponding to the corneal curvature and a sphere representing an eyeball; a distance s between pupil-center coordinates and corneal-curvature-center coordinates; a distance t between corneal-curvature-center coordinates and eyeball-center coordinates; and a distance r between corneal-reflection-center coordinates and corneal-curvature-center coordinates (see FIG. 4).

From a facial image, the corneal-reflection-position estimation section 42 calculates the two-dimensional coordinates of a corneal reflection center in the facial image, and based on the two-dimensional coordinates of the corneal reflection center in the facial image and on the set of provisional eyeball-center coordinates E in the facial-model coordinate system, estimates a three-dimensional vector p from a camera position C to a corneal reflection center P.

The corneal-curvature-center calculation section 44 uses the three-dimensional vector p and the distance r between the corneal reflection center P and a corneal curvature center A to estimate a three-dimensional vector a from the camera position C to the corneal curvature center A, as expressed by the following equation.

$$a = \frac{\|p\| + r}{\|p\|} p$$

Figure 5:
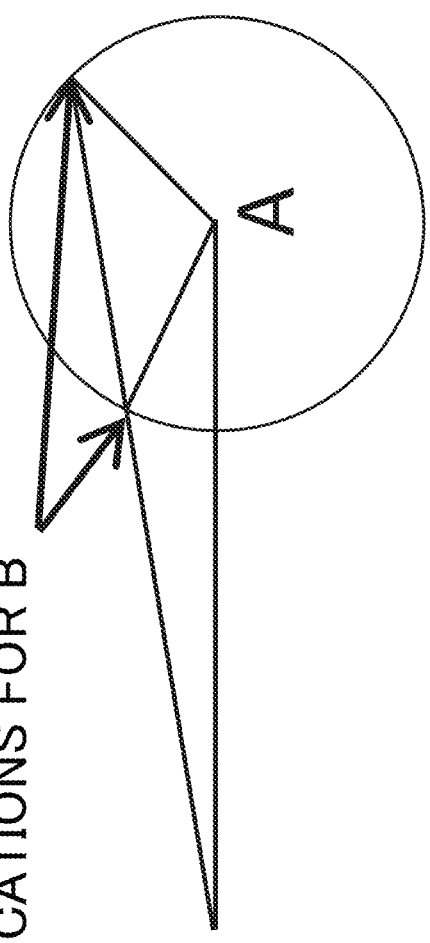
FIG. 5 is a diagram to explain a method of calculating an apparent three-dimensional position of a pupil center.

From a facial image, the gaze-vector calculation section 46 calculates the two-dimensional coordinates of a pupil center (the apparent pupil center) B in the facial image. Using the two-dimensional coordinates of the pupil center (the apparent pupil center) B in the facial image, the three-dimensional vector a, and the distance r between the corneal reflection center P and the corneal curvature center A, the gaze-vector calculation section 46 finds a three-dimensional vector b from the camera position C to the apparent pupil center B. Note that as illustrated in FIG. 5, there are two candidates for apparent pupil center B, and the apparent pupil center B for which Z in on the camera side (i.e. smallest) should be selected.

The gaze-vector calculation section 46 then uses the three-dimensional vector b and the three-dimensional vector p to calculate a distance u between the corneal reflection center P and the apparent pupil center B. The gaze-vector calculation section 46 uses the three-dimensional vector p and the three-dimensional vector b to calculate an angle c between the three-dimensional vector p and the three-dimensional vector b according to the following equation.

$$\varepsilon = \cos^{-1}\left(\frac{b \cdot p}{\|b\|\|p\|}\right)$$

The gaze-vector calculation section 46 uses the distance r between the corneal reflection center P and the corneal curvature center A, and the distance u between the corneal reflection center P and the apparent pupil center B ($=\|b-p\|$), to calculate an angle θ between the three-dimensional vector p and the three-dimensional vector from the apparent pupil center B to the corneal curvature center A, according to the following equation.

$$\theta = 2\sin^{-1}\left(\frac{\|b - p\|}{2r}\right)$$

The gaze-vector calculation section 46 uses the calculation results for the angle ε between the three-dimensional vector p and the three-dimensional vector b, and the calculation results for the angle θ between the three-dimensional vector p and the three-dimensional vector from the apparent pupil center B to the corneal curvature center A, to calculate an angle ψ between the three-dimensional vector from the apparent pupil center B to the corneal curvature center A and a three-dimensional vector from a true pupil center B' to an eyeball center E, according to the following equation. In the following equation, r denotes the radius of corneal curvature, s denotes the distance between a and B', $n_1$ denotes the refractive index of air, and $n_2$ denotes the refractive index of the lens of the eye at the inside of the cornea.

$$\varphi = \sin^{-1}\left(\frac{r}{s}\frac{n_1}{n_2}\sin\left(\cos^{-1}\left(\frac{b \cdot p}{\|b\|\|p\|}\right) + 2\sin^{-1}\left(\frac{\|b - p\|}{2r}\right)\right)\right) - \sin^{-1}\left(\frac{n_1}{n_2}\sin\left(\cos^{-1}\left(\frac{b \cdot p}{\|b\|\|p\|}\right) + 2\sin^{-1}\left(\frac{\|b - p\|}{2r}\right)\right)\right)$$

The gaze-vector calculation section 46 calculates a gaze vector angle $(=\theta+\psi)$ by adding the angle $\theta$ between the three-dimensional vector p and the three-dimensional vector from the apparent pupil center B to the corneal curvature center A, to the angle $\psi$ between the three-dimensional vector from the apparent pupil center B to the corneal curvature center A and the three-dimensional vector from the true pupil center B' to the eyeball center E.

The gaze-vector calculation section 46 finds a gaze vector d based on this gaze vector angle $(=\theta+\psi)$, the three-dimensional vector p from the camera position C to the corneal reflection center P, and the three-dimensional vector b from the camera position C to the apparent pupil center B. Note that since the equation is also satisfied for $-(\theta+\psi)$, the gaze vector d having a y component greater than the y component of the three-dimensional vector p, or for rd closest to B, should be selected.

The camera-coordinate-system eyeball-center-coordinates calculation section 30 calculates eyeball-center coordinates e in the camera coordinate system based on the gaze vector d, the three-dimensional vector a from the camera position C to the corneal curvature center A, and the distance t between the corneal curvature center A and the eyeball center E, as expressed by the following equation.

$$e = a + td$$

The eyeball-center-coordinates transformation section 32 transforms the eyeball-center coordinates e in the camera coordinate system into eyeball-center coordinates e' in the facial-model coordinate system based on the rotational component R and the translational component t for transforming the camera coordinate system into the facial-model coordinate system.

$$e' = Re + t$$

The fixed parameter calculation section 33 calculates a set of eyeball-center coordinates e' in the facial-model coordinate system for use as a fixed parameter, based on a time series of the eyeball-center coordinates e' in the facial-model coordinate system obtained by the eyeball-center-coordinates transformation section 32 for a time series of facial images. This set of eyeball-center coordinates e' is stored in the fixed parameter storage section 34.

For example, an average of the time series of the eyeball-center coordinates e' in the facial-model coordinate system is calculated for use as a fixed parameter. Alternatively, the set of eyeball-center coordinates e' in the facial-model coordinate system for use as a fixed parameter may be calculated by solving a nonlinear optimization problem to minimize the distribution of the eyeball-center coordinates e' based on the time series of eyeball-center coordinates e' in the facial-model coordinate system.

From a facial image, the eyeball-center-based gaze detection section 36 uses pattern matching to extract a region where the pupil of an eye appears, and detects the center of the extracted region where the pupil of the eye appears as two-dimensional coordinates of the pupil center of the eye in the facial image.

The eyeball-center-based gaze detection section 36 is employed to perform transforms into a three-dimensional position of the eyeball center in the camera coordinate system, based on the set of eyeball-center coordinates in the facial-model coordinate system that is stored in the fixed parameter storage section 34, and the rotational component R and the translational component t for transforming the camera coordinate system into the facial-model coordinate system.

Specifically, the eyeball-center-based gaze detection section 36 uses the rotational component R and the translational component t, which were estimated by the face position-and-orientation estimation section 24 for transforming the camera coordinate system into the facial-model coordinate system, to transform the eyeball-center coordinates of the eye in the facial-model coordinate system into eyeball-center coordinates of the eye in the camera coordinate system.

Also, based on the two-dimensional coordinates of the pupil center of the eye in the facial image and on a focal distance parameter of the camera, the eyeball-center-based gaze detection section 36 estimates the three-dimensional position of the pupil center of the eye in the camera coordinate system.

The eyeball-center-based gaze detection section 36 calculates a gaze vector from a three-dimensional position of the eyeball center in the camera coordinate system to the three-dimensional position of the pupil center of the eye in the camera coordinate system. This gaze vector is output by the output section 16.

Gaze-Tracking Device Operation

Explanation follows regarding operation of the gaze-tracking device 10. First, facial images of a subject are successively imaged by the imaging section 12 while near-infrared light is being illuminated on the eyes of the subject by the illumination section 13.

Figure 6:
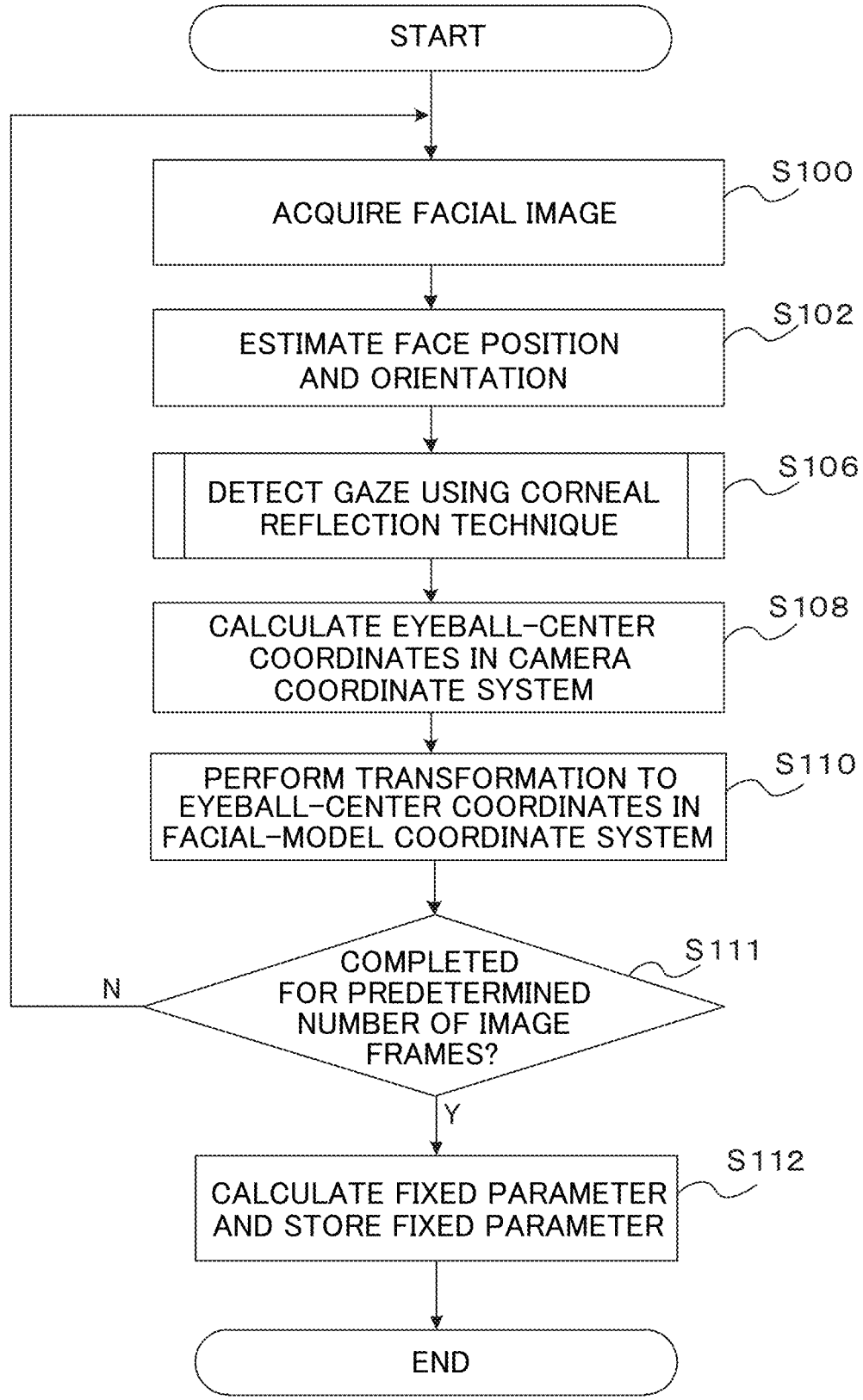
FIG. 6 is a flowchart illustrating details of an eyeball-center calculation processing routine of a gaze-tracking device according to the first exemplary embodiment.

Then, the computer 14 executes the eyeball-center calculation processing routine illustrated in FIG. 6. First, at step S100, the computer 14 acquires a facial image captured by the imaging section 12.

Then, at step S102, the computer 14 extracts feature points of the face from the facial image. The computer 14 estimates the rotation of the face ($\psi c$, $\theta c$, $\varphi c$) and the position of the facial model origin (Xc, Yc, Zc) in the camera coordinate system (see FIG. 2) as the three-dimensional position and orientation of the face in the camera coordinate system, and takes these estimates as a rotational component R and a translational component t for transforming the camera coordinate system into the facial-model coordinate system.

At step S106, the computer 14 uses a corneal reflection technique to calculate a gaze vector d in the camera coordinate system from the facial image acquired at step S100.

At step S108, the computer 14 calculates eyeball-center coordinates e in the camera coordinate system based on the gaze vector d, the three-dimensional vector a from the camera position C to the corneal curvature center A, and the distance t between the corneal curvature center A and the eyeball center E.

At step S110, the computer 14 performs a transformation into eyeball-center coordinates e' in the facial-model coordinate system based the eyeball-center coordinates e in the camera coordinate system, and the rotational component R and the translational component t for transforming the camera coordinate system into the facial-model coordinate system that were estimated at step S102.

At step S111, the computer 14 determines whether or not the processing of steps S100 to S110 has been repeatedly executed for a predetermined number of image frames. The computer 14 returns to step S100 in cases in which the processing of steps S100 to S110 has not been repeatedly executed for the predetermined number of image frames. The computer 14 transitions to step S112 in cases in which the processing of steps S100 to S110 has been repeatedly executed for the predetermined number of image frames.

At step S112, based on the plural sets of eyeball-center coordinates e' in the facial-model coordinate system obtained by repeatedly executing step S110, the computer 14 calculates a set of eyeball-center coordinates e' in the facial-model coordinate system for use as a fixed parameter. The computer 14 then stores this fixed parameter in the fixed parameter storage section 34, and ends the eyeball-center calculation processing routine. The computer 14 also stops the illumination of light by the illumination section 13.

Figure 7:
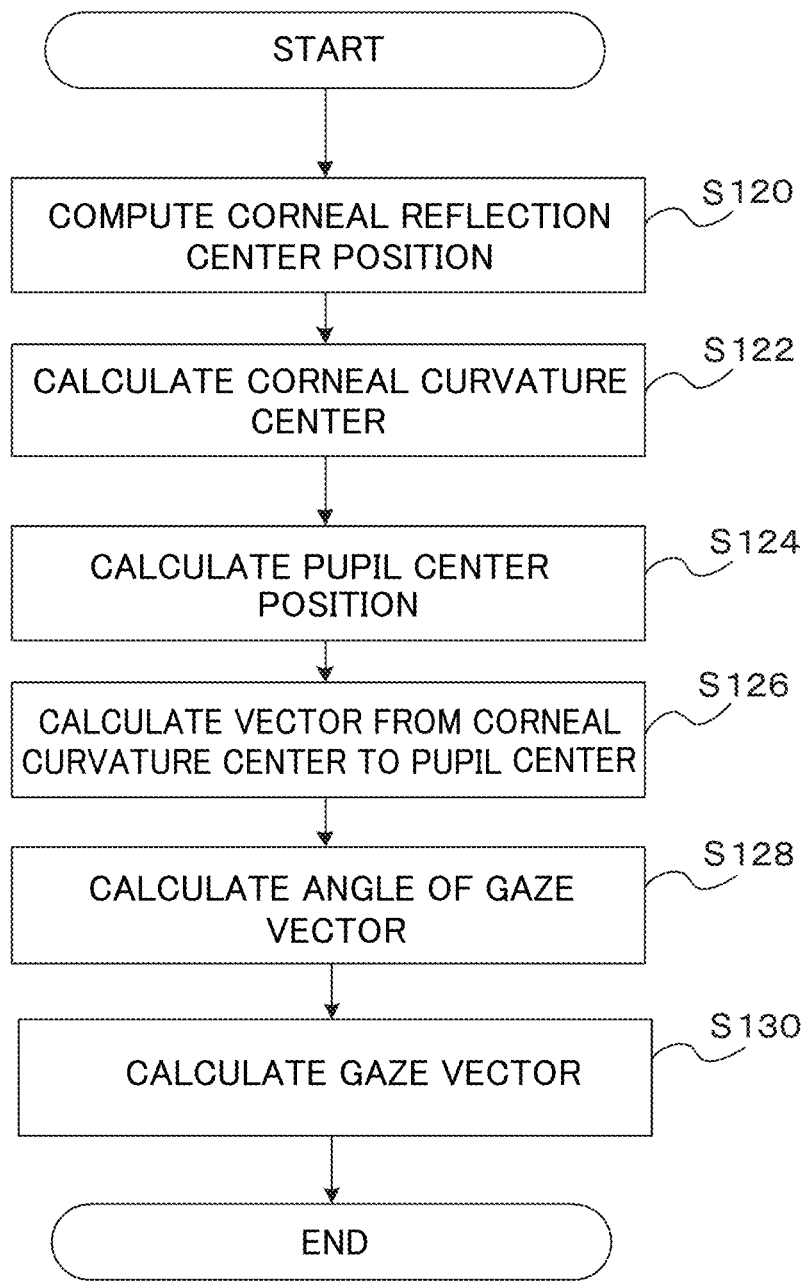
FIG. 7 is a flowchart illustrating a flow of processing for gaze detection utilizing a corneal reflection technique in the gaze-tracking device according to the first exemplary embodiment.

Step S106 is performed by executing the processing routine illustrated in FIG. 7.

First, at step S120, from the facial image the computer 14 calculates the two-dimensional coordinates of a corneal reflection center in the facial image. Based on the two-dimensional coordinates of the corneal reflection center in the facial image and on the provisional eyeball-center coordinates E' in the facial-model coordinate system, the computer 14 estimates a three-dimensional vector p from the camera position C to a corneal reflection center P.

At step S122, the computer 14 uses the three-dimensional vector p estimated at step S120 and the distance r between the corneal reflection center P and a corneal curvature center A to estimate a three-dimensional vector a from the camera position C to the corneal curvature center A.

At step S124, from the facial image the computer 14 calculates the two-dimensional coordinates of a pupil center (the apparent pupil center) B in the facial image. At step S126, using the two-dimensional coordinates of the pupil center (the apparent pupil center) B in the facial image, the three-dimensional vector a estimated at step S122, and the distance r between the corneal reflection center P and the eyeball center E, the computer 14 finds a three-dimensional vector b from the camera position C to the apparent pupil center B.

At step S128, the computer 14 uses the three-dimensional vector b found at step S124 and the three-dimensional vector p estimated at step S120, to calculate a distance u between the corneal reflection center P and the apparent pupil center B. The computer 14 also uses the three-dimensional vector p and the three-dimensional vector b to calculate an angle between the three-dimensional vector p and the three-dimensional vector b. The computer 14 also uses the distance r between the corneal reflection center P and the corneal curvature center A and the distance u between the corneal reflection center P and the apparent pupil center B ($=\|b-p\|$) to calculate the angle $\theta$ between the three-dimensional vector p and the three-dimensional vector from the apparent pupil center B to the corneal curvature center A. The computer 14 also uses the calculation results for the angle c between the three-dimensional vector p and the three-dimensional vector b and the calculation results for the angle $\theta$ between the three-dimensional vector p and the three-dimensional vector from the apparent pupil center B to the corneal curvature center A to calculate the angle $\psi$ between the three-dimensional vector from the apparent pupil center B to the corneal curvature center A and the three-dimensional vector from the true pupil center B' to the eyeball center E.

The computer 14 then calculates a gaze vector angle by adding together the angles calculated above, namely adding the angle $\theta$ between the three-dimensional vector p and the three-dimensional vector from the apparent pupil center B to the corneal curvature center A, to the angle $\psi$ between the three-dimensional vector from the apparent pupil center B to the corneal curvature center A and the three-dimensional vector from a true pupil center B' to the eyeball center E.

At step S130, the computer 14 finds the gaze vector d based on the gaze vector angle, the three-dimensional vector p from the camera position C to the corneal reflection center P, and the three-dimensional vector b from the camera position C to the apparent pupil center B, that were calculated at step S128, and then ends the processing routine.

Figure 8:
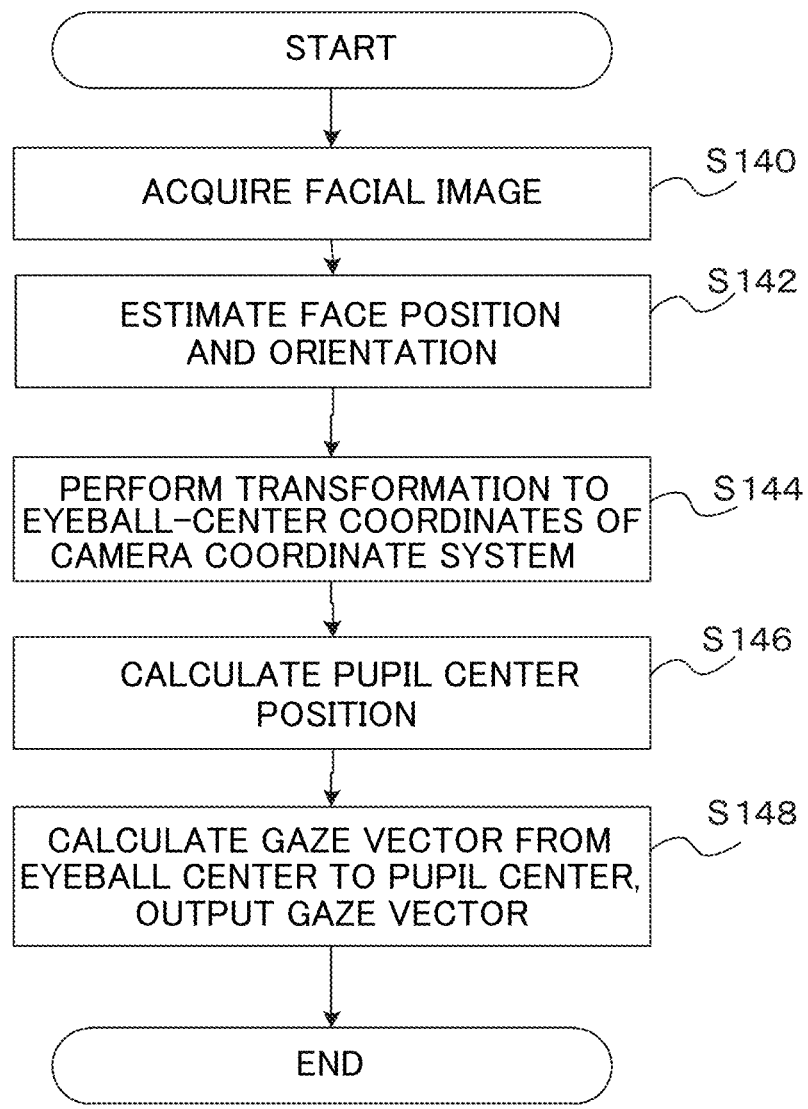
FIG. 8 is a flowchart illustrating details of a gaze-tracking processing routine of a gaze-tracking device according to the first exemplary embodiment.
Figure 9:
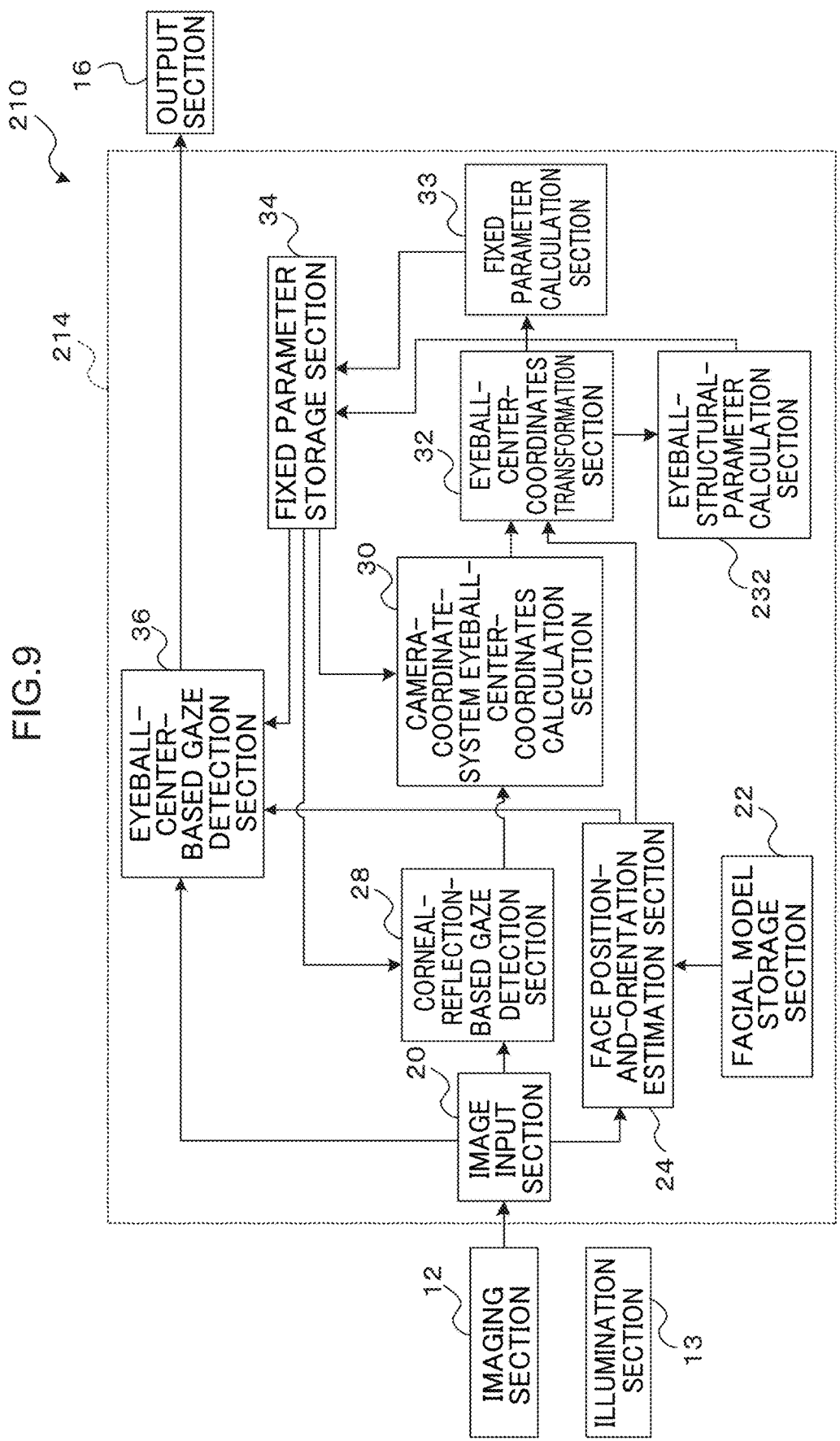
FIG. 9 is a block diagram illustrating configuration of a gaze-tracking device according to a second exemplary embodiment.

The gaze-tracking processing routine illustrated in FIG. 8 is executed by the computer 14 for each captured facial image while facial images of the subject are being successively imaged by the imaging section 12. First, at step S140, the computer 14 acquires a facial image captured by the imaging section 12.

At step S142, the computer 14 extracts feature points of the face in the facial image. The computer 14 estimates the rotation of the face ($\psi c$, $\theta c$, $\varphi c$) and the facial model origin position (Xc, Yc, Zc) in the camera coordinate system (see FIG. 2) as the three-dimensional position and orientation of the face in the camera coordinate system, and takes these estimates as the rotational component R and the translational component t for transforming from the camera coordinate system into the facial-model coordinate system.

At step S144, the computer 14 uses the rotational component R and the translational component t, which were estimated at step S142 for transforming the camera coordinate system into the facial-model coordinate system, to transform the eyeball-center coordinates of the eye in the facial-model coordinate system stored in the fixed parameter storage section 34 into eyeball-center coordinates of the eye in the camera coordinate system.

At step S146, the computer 14 uses pattern matching to extract a region in which the pupil of an eye appears in the facial image obtained at step S140, and detects the center of the extracted region in which the pupil of the eye appears as the two-dimensional coordinates of the pupil center of the eye in the facial image. Then the computer 14 estimates the three-dimensional position of the pupil center of the eye in the camera coordinate system based on the two-dimensional coordinates of the pupil center of the eye in the facial image and on a focal distance parameter of the camera.

At step S148, the computer 14 calculates a gaze vector from a three-dimensional position of the eyeball center in the camera coordinate system to the three-dimensional position of the pupil center of the eye in the camera coordinate system, based on the three-dimensional position of the eyeball center of the eye in the camera coordinate system obtained at step S144 and on the three-dimensional position of the pupil center of the eye in the camera coordinate system obtained at step S146. This gaze vector is output by the output section 16 and then the computer 14 ends the gaze-tracking processing routine.

As described above, the gaze-tracking device according to the first exemplary embodiment calculates, for use as a fixed parameter, the three-dimensional position of the eyeball center in the three-dimensional facial-model coordinate system from the gaze vectors calculated using corneal reflections. The gaze-tracking device then calculates a three-dimensional gaze vector from the three-dimensional position of the eyeball center to the three-dimensional position of the pupil center. This enables accurate gaze tracking to be performed using a simple configuration and without performing calibration.

From a gaze vector calculated using a corneal reflection, the gaze-tracking device, program, and method of an aspect of the present invention calculate for use as a fixed parameter a three-dimensional position of the center of an eyeball in a coordinate system of a three-dimensional facial model, and calculate a three-dimensional gaze vector from a three-dimensional position of the eyeball center to a three-dimensional position of the pupil center. This obtains the excellent advantageous effect of enabling accurate gaze tracking to be performed using a simple configuration and without performing calibration.

Since the eyeball center in the facial-model coordinate system does not change over time, the gaze-tracking device stores the eyeball center for use as a fixed parameter. This realizes high-accuracy gaze tracking without performing the calibration normally performed in gaze detection. Eliminating the need to perform calibration enhances the ease of use for the user.

Second Exemplary Embodiment

Explanation follows regarding a second exemplary embodiment. Note that the same reference signs are appended to portions that are configured similarly to those in the first exemplary embodiment, and explanation thereof will be omitted.

The second exemplary embodiment differs from the first exemplary embodiment in that in addition to the eyeball-center coordinates in the facial-model coordinate system, structural parameters of the facial model are also estimated for use as fixed parameters.

Overview of Second Exemplary Embodiment

In the second exemplary embodiment, structure parameters (the distance s between the true pupil center B' and the corneal curvature center A, the distance t between the corneal curvature center A and the eyeball center E, and the distance r between the corneal reflection center P and the corneal curvature center A) of a facial model are estimated by utilizing the non-moving point nature of the eyeball-center coordinates e in the facial-model coordinate system (i.e. coordinate values that do not change).

Gaze-Tracking Device Configuration

A computer 214 of a gaze-tracking device 210 according to the second exemplary embodiment includes an image input section 20, a facial model storage section 22, a face position-and-orientation estimation section 24, a corneal-reflection-based gaze detection section 28, a camera-coordinate-system eyeball-center-coordinates calculation section 30, an eyeball-center-coordinates transformation section 32, a fixed parameter calculation section 33, an eyeball-structural-parameter calculation section 232, a fixed parameter storage section 34, and an eyeball-center-based gaze detection section 36.

Based on a time series of eyeball-center coordinates of the eye in the facial-model coordinate system obtained by the eyeball-center-coordinates transformation section 32 for a time series of facial images, the eyeball-structural-parameter calculation section 232 calculates the distance s between the true pupil center B' and the corneal curvature center A, the distance t between the corneal curvature center A and the eyeball center E, and the distance r between the corneal reflection center P and the corneal curvature center A, these being structural parameters of the facial model, so as to optimize an objective function expressed by the following equations.

$$\operatorname{argmin}_{s,t,r}: E(f^2(s, t, r, p, b)) - (E(f(s, t, r, p, b)))^2 =$$

-continued $$\operatorname{argmin}_{s,t,r}: \sum_{i=0}^{N-1} \frac{f_{x,i}^2(s, t, r, p, b)}{N} - \left(\sum_{i=0}^{N-1} \frac{f_{x,i}(s, t, r, p, b)}{N}\right)^2 +$$

$$\sum_{i=0}^{N-1} \frac{f_{y,i}^2(s, t, r, p, b)}{N} - \left(\sum_{i=0}^{N-1} \frac{f_{y,i}(s, t, r, p, b)}{N}\right)^2 +$$

$$\sum_{i=0}^{N-1} \frac{f_{z,i}^2(s, t, r, p, b)}{N} - \left(\sum_{i=0}^{N-1} \frac{f_{z,i}(s, t, r, p, b)}{N}\right)^2$$

wherein $$e' =$$

$$Re + t = R(a + td) + t = Ra + t + Rdt = f(s, t, r, p, b) = \begin{pmatrix} f_x(s, t, r, p, b) \\ f_y(s, t, r, p, b) \\ f_z(s, t, r, p, b) \end{pmatrix}$$

and E represents an average.

Specifically, the above objective function should be partially differentiated with respect to s, t, and r to find parameters when a partial differential value becomes 0.

The fixed parameter storage section 34 stores the set of eyeball-center coordinates in the facial-model coordinate system obtained by the eyeball-center-coordinates transformation section 32 for use as a fixed parameter. The fixed parameter storage section 34 also stores, for use as fixed parameters, the distance s between the true pupil center B' and the corneal curvature center A, the distance t between the corneal curvature center A and the eyeball center E, and the distance r between the corneal reflection center P and the corneal curvature center A, which were calculated by the eyeball-structural-parameter calculation section 232.

After the distance s between the true pupil center B' and the corneal curvature center A, the distance t between the corneal curvature center A and the eyeball center E, and the distance r between the corneal reflection center P and the corneal curvature center A have been stored in the fixed parameter storage section 34, once again the corneal-reflection-based gaze detection section 28 uses a corneal reflection technique to calculate a gaze vector in the camera coordinate system and the camera-coordinate-system eyeball-center-coordinates calculation section 30 calculates eyeball-center coordinates e in the camera coordinate system. When this happens, the distance s between the true pupil center B' and the corneal curvature center A, the distance t between the corneal curvature center A and the eyeball center E, and the distance r between the corneal reflection center P and the corneal curvature center A calculated by the eyeball-structural-parameter calculation section 232 are employed in the corneal-curvature-center calculation section 44, in the gaze-vector calculation section 46, and in the camera-coordinate-system eyeball-center-coordinates calculation section 30.

Note that other configuration and operation of the gaze-tracking device according to the second exemplary embodiment is the same as that of the first exemplary embodiment, and so explanation will be omitted thereof.

In this manner, since the eyeball center in the facial-model coordinate system does not change over time, eyeball structural parameters similarly do not change with time. The gaze-tracking device 210 uses these eyeball structural parameters and image measurement values to establish equations to find the eyeball center, enabling the eyeball structural parameters to be found using an evaluation function expressing no timewise movement of the eyeball center.

Note that although in the above exemplary embodiments an example was given in which the imaging direction of the imaging section 12 and the illumination direction of the illumination section 13 are disposed so as to be coaxial, there is no limitation thereto. When the imaging direction of the imaging section 12 and the illumination direction of the illumination section 13 are not coaxially disposed, an approximation calculation should be performed according to the discrepancy between the imaging direction of the imaging section 12 and the illumination direction of the illumination section 13.

What is claimed is:

1. A gaze-tracking device, comprising
a processor configured to implement:
a first gaze-vector calculation section that, from a time series of a facial image captured by an imaging section that images a face of an observation subject, and representing the face, which was imaged while light was illuminated from an illumination section onto an eye of the observation subject, uses a corneal reflection of the eye of the face in the facial image, a pupil center position of the eye of the face in the facial images, and a predetermined three-dimensional eyeball model, to calculate a time series of a three-dimensional gaze vector in a camera coordinate system;
a face position-and-orientation estimation section that estimates a time series of a three-dimensional position and orientation of the face based on the time series of the facial image and on a predetermined three-dimensional facial model;
an eyeball-center-position calculation section that calculates a time series of a three-dimensional position of an eyeball center in a coordinate system of the three-dimensional facial model based on the time series of the three-dimensional position and orientation of the face estimated by the face position-and-orientation estimation section and on the time series of the gaze vector calculated by the first gaze-vector calculation section;
a fixed parameter calculation section that calculates, for use as a fixed parameter, a three-dimensional position of the eyeball center in the three-dimensional facial-model coordinate system, based on the time series of the three-dimensional position of the eyeball center in the three-dimensional facial-model coordinate system calculated by the eyeball-center-position calculation section; and
a second gaze-vector calculation section that calculates a three-dimensional gaze vector from a three-dimensional position of the eyeball center to a three-dimensional position of a pupil center in the camera coordinate system, based on the pupil center position of the eye of the face in the facial image representing the face imaged by the imaging section, on the three-dimensional position of the eyeball center calculated by the fixed parameter calculation section, and on the three-dimensional position and orientation of the face estimated by the face position-and-orientation estimation section.

2. The gaze-tracking device of claim 1, further comprising an eyeball-structural-parameter calculation section that, based on a time series of the three-dimensional position of the eyeball center in the three-dimensional facial-model coordinate system calculated by the eyeball-center-position calculation section, utilizes the non-changing three-dimensional position of the eyeball center in the three-dimensional facial-model coordinate system to calculate, for use as a fixed parameter, an eyeball structural parameter.

3. The gaze-tracking device of claim 1, wherein:
the first gaze-vector calculation section includes:
a corneal-reflection-position estimation section that, based on the corneal reflection of the eye of the face and on the three-dimensional eyeball model, estimates a three-dimensional position of the corneal reflection, and
a corneal-curvature-center calculation section that calculates a three-dimensional position of a corneal curvature center based on the three-dimensional position of the corneal reflection; and
the first gaze-vector calculation section calculates a three-dimensional gaze vector in the camera coordinate system based on the three-dimensional position of the corneal reflection and on the three-dimensional position of the corneal curvature center.

4. The gaze-tracking device of claim 1, wherein the eyeball-center-position calculation section includes:
a camera-coordinate-system eyeball-center-coordinate calculation section that calculates a three-dimensional position of the eyeball center in the camera coordinate system based on the gaze vector calculated by the first gaze-vector calculation section; and
a facial-coordinate-system eyeball-center-coordinate transformation section that transforms the three-dimensional position of the eyeball center in the camera coordinate system into a three-dimensional position of the eyeball center in the three-dimensional facial-model coordinate system, based on the three-dimensional position and orientation of the face estimated by the face position-and-orientation estimation section.

5. The gaze-tracking device of claim 1, wherein the second gaze-vector calculation section:
calculates the three-dimensional position of the pupil center position based on the pupil center position of the eye of the face in the facial image representing the face imaged by the imaging section, and on a parameter related to the imaging section;
transforms the three-dimensional position of the eyeball center calculated by the fixed parameter calculation section into a three-dimensional position of the eyeball center in the camera coordinate system, based on the three-dimensional position and orientation of the face estimated by the face position-and-orientation estimation section; and
calculates a three-dimensional gaze vector from the three-dimensional position of the eyeball center to the three-dimensional position of the pupil center in the camera coordinate system.

6. A non-transitory computer readable medium storing a program causing a computer to execute a process for gaze-tracking, the process comprising:
from a time series of a facial image captured by an imaging section that images a face of an observation subject, and representing the face, which was imaged while light was illuminated from an illumination section onto an eye of the observation subject, using a corneal reflection of the eye of the face in the facial image, a pupil center position of the eye of the face in the facial images, and a predetermined three-dimensional eyeball model, to calculate a time series of a three-dimensional gaze vector in a camera coordinate system;

estimating a time series of a three-dimensional position and orientation of the face based on the time series of the facial image and on a predetermined three-dimensional facial model;

calculating a time series of a three-dimensional position of an eyeball center in a coordinate system of the three-dimensional facial model, based on the time series of the estimated three-dimensional position and orientation of the face and on the time series of the calculated gaze vector;

calculating, for use as a fixed parameter, a three-dimensional position of the eyeball center in the three-dimensional facial-model coordinate system, based on the time series of the calculated three-dimensional position of the eyeball center in the three-dimensional facial-model coordinate system; and calculating a three-dimensional gaze vector from a three-dimensional position of the eyeball center to a three-dimensional position of a pupil center in the camera coordinate system, based on the pupil center position of the eye of the face in the facial image representing the face imaged by the imaging section, on the calculated three-dimensional position of the eyeball center, and on the estimated three-dimensional position and orientation of the face.

7. A gaze-tracking method, comprising:

employing a first gaze-vector calculation section to, from a time series of a facial image captured by an imaging section that images a face of an observation subject, and representing the face, which was imaged while light was illuminated from an illumination section onto an eye of the observation subject, use a corneal reflection of the eye of the face in the facial image, a pupil center position of the eye of the face in the facial images, and a predetermined three-dimensional eyeball model, to calculate a time series of a three-dimensional gaze vector in a camera coordinate system;

employing a face position-and-orientation estimation section to estimate a time series of a three-dimensional position and orientation of the face, based on the time series of the facial image and on a predetermined three-dimensional facial model;

employing an eyeball-center-position calculation section to calculate a time series of a three-dimensional position of an eyeball center in a coordinate system of the three-dimensional facial model, based on the time series of the three-dimensional position and orientation of the face estimated by the face position-and-orientation estimation section and on the time series of the gaze vector calculated by the first gaze-vector calculation section;

employing a fixed parameter calculation section to calculate, for use as a fixed parameter, a three-dimensional position of the eyeball center in the three-dimensional facial-model coordinate system, based on the time series of the three-dimensional position of the eyeball center in the three-dimensional facial-model coordinate system calculated by the eyeball-center-position calculation section; and employing a second gaze-vector calculation section to calculate a three-dimensional gaze vector from a three-dimensional position of the eyeball center to a three-dimensional position of a pupil center in the camera coordinate system, based on the pupil center position of the eye of the face in the facial image representing the face imaged by the imaging section, on the three-dimensional position of the eyeball center calculated by the fixed parameter calculation section, and on the three-dimensional position and orientation of the face estimated by the face position-and-orientation estimation section.

* * * * *